United States Patent
Satija et al.

(10) Patent No.: US 10,785,214 B2
(45) Date of Patent: *Sep. 22, 2020

(54) ALTERNATE USER COMMUNICATION ROUTING FOR A ONE-TIME CREDENTIAL

(71) Applicant: BANK OF AMERICA CORPORATION, Charlotte, NC (US)

(72) Inventors: Dharmender Kumar Satija, Rye Brook, NY (US); Eren Kursun, New York, NY (US); Andrew DongHo Kim, Glendale, AZ (US); Scott Anderson Sims, Tega Cay, SC (US); Craig D. Widmann, Chandler, AZ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 222 days.

This patent is subject to a terminal disclaimer.

(21) Appl. No.: 15/995,831

(22) Filed: Jun. 1, 2018

(65) Prior Publication Data

US 2019/0372966 A1    Dec. 5, 2019

(51) Int. Cl.
*H04L 29/06* (2006.01)
*H04L 12/725* (2013.01)
*H04L 12/707* (2013.01)

(52) U.S. Cl.
CPC .......... *H04L 63/0838* (2013.01); *H04L 45/22* (2013.01); *H04L 45/308* (2013.01); *H04L 63/102* (2013.01)

(58) Field of Classification Search
CPC .................................................. H04L 63/0838
See application file for complete search history.

(56) References Cited

U.S. PATENT DOCUMENTS

| | | |
|---|---|---|
| 5,351,290 A | 9/1994 | Naeini et al. |
| 5,602,906 A | 2/1997 | Phelps |
| 5,706,338 A | 1/1998 | Relyea et al. |
| 5,768,354 A | 6/1998 | Lange et al. |
| 5,805,686 A | 9/1998 | Moller et al. |
| 6,163,604 A | 12/2000 | Baulier et al. |
| 6,219,538 B1 | 4/2001 | Kaminsky et al. |
| 6,327,352 B1 | 12/2001 | Betts et al. |
| 6,643,362 B2 | 11/2003 | Hogan et al. |
| 6,856,982 B1 | 2/2005 | Stevens et al. |
| 7,251,624 B1 | 7/2007 | Lee et al. |
| 7,327,837 B1 | 2/2008 | Harlow et al. |

(Continued)

*Primary Examiner* — Shawnchoy Rahman
(74) *Attorney, Agent, or Firm* — Michael A. Springs; Moore & Van Allen PLLC; Jeffrey R. Gray

(57) ABSTRACT

The invention relates to alternate user communication routing for a one-time credential. When a user is determined to be an unauthorized user, the unauthorized user may be provided with an alternative one-time credential (e.g., one-time password, or the like) in response to the user trying to take an action (e.g., to access the organization systems in order to access information). When the unauthorized user tries to utilize the alternative one-time credential, the organization may identify the user as unauthorized and determine how to respond to the unauthorized user. In addition to the alternative one-time credential, one or more additional alternate treatments may be presented to the unauthorized user in order to identify, track, and/or prevent access by the unauthorized user.

19 Claims, 3 Drawing Sheets

(56) References Cited

U.S. PATENT DOCUMENTS

| | | |
|---|---|---|
| 8,031,849 B1 | 10/2011 | Apple et al. |
| 8,359,006 B1 | 1/2013 | Zang et al. |
| 8,411,833 B2 | 4/2013 | Dolan et al. |
| 8,725,810 B1 * | 5/2014 | Bau ................. H04L 51/04 709/204 |
| 8,869,251 B2 * | 10/2014 | Miller ............ H04L 63/0815 713/168 |
| 8,955,143 B1 * | 2/2015 | Ramalingam ........ G06F 21/56 726/26 |
| 9,203,962 B2 | 12/2015 | Guerra et al. |
| 9,270,833 B2 | 2/2016 | Ballai et al. |
| 9,419,988 B2 | 8/2016 | Alexander |
| 9,426,302 B2 | 8/2016 | Layman et al. |
| 9,674,177 B1 * | 6/2017 | Nystrom .............. H04L 63/083 |
| 9,699,660 B1 | 7/2017 | Blatt et al. |
| 9,774,726 B1 | 9/2017 | Jenkins et al. |
| 10,390,319 B2 * | 8/2019 | Kalhan ............ H04W 56/0015 |
| 2004/0249866 A1 | 12/2004 | Chen et al. |
| 2005/0278550 A1 | 12/2005 | Mahone et al. |
| 2007/0124246 A1 | 5/2007 | Lawyer et al. |
| 2008/0140447 A1 * | 6/2008 | Pourfallah .......... G06Q 10/10 705/2 |
| 2010/0229223 A1 * | 9/2010 | Shepard .............. G06F 21/31 726/5 |
| 2012/0054834 A1 * | 3/2012 | King .................. G06F 21/31 726/4 |
| 2012/0263285 A1 | 10/2012 | Rajakumar et al. |
| 2012/0287810 A1 | 11/2012 | Shim et al. |
| 2013/0336169 A1 | 12/2013 | Tai et al. |
| 2014/0129585 A1 * | 5/2014 | Furniss ............ G06F 16/242 707/765 |
| 2015/0124957 A1 | 5/2015 | Roncoroni et al. |
| 2017/0295567 A1 * | 10/2017 | Chen ............... H04W 72/048 |
| 2019/0245877 A1 * | 8/2019 | Toth .................. G06N 20/00 |

* cited by examiner

ALTERNATE USER COMMUNICATION ROUTING FOR A ONE-TIME CREDENTIAL

FIELD

The present invention relates generally to deterring unauthorized users, and more particularly, to identifying unauthorized users and providing alternate treatments to deter the unauthorized users from accessing information.

BACKGROUND

Organizations institute systems and procedures for handling unauthorized users and/or unauthorized access requests. These systems and procedures are tailored to identifying potential unauthorized users and/or unauthorized requests. However, improved systems and procedures are needed for identifying potential unauthorized users and/or unauthorized requests and also for responding to the unauthorized users to deter (e.g., prevent and/or reduce) future unauthorized requests.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Generally, systems, computer products, and methods are described herein for alternate user communication routing for a one-time credential. For example, when a user is determined to be an unauthorized user, the unauthorized user may be provided with an alternative one-time credential (e.g., alternative one-time credential may include an imitation one-time credential, or the like, such as an imitation one-time password, or the like) in response to the user trying to take an action (e.g., to access the organization systems in order to access information). The alternative one-time credential may be embedded with markers that allow the organization to monitor the unauthorized user and/or any action requests made through the use of the alternative one-time credential. For example, when the unauthorized user tries to utilize the alternative one-time credential, the organization may identify the user as unauthorized and determine how to respond to the unauthorized user. For the purposes of capturing further information, the organization may request a separate channel of communication be used to transmit the alternative one-time credential, such as in a two factor authentication process. The organization may request an alternate email, telephone number, or the like to transmit the alternative one-time credential and may subsequently log the email address, telephone number, or the like in the unauthorized user's information for later reference and identification purposes. It should be understood, that the use of the alternative one-time credential allows the organization to more easily identify unauthorized users (e.g., in future requests from the unauthorized users, or the like), track the actions of the unauthorized users (e.g., through markers in the alternative one-time credential, or the like), and/or prevent unauthorized access by the unauthorized users (e.g., prevent the unauthorized user from access the requested information, or the like). In addition to the alternative one-time credential, one or more additional alternate treatments may be presented to the unauthorized users in order to identify, track, and/or prevent access by unauthorized users. The alternate treatments for unauthorized users discussed herein improve the security of the organizations systems by providing alternate treatments to unauthorized users in a way that randomizes how unauthorized users are treated, which deters the unauthorized users from being able to identify how they will be treated and develop responses for the alternate treatments.

Embodiments of the invention comprise systems, computer implemented methods, and computer program products for providing an alternate treatment for an interaction with unauthorized users. The invention comprises receiving a request from a user to access information, and receiving an authentication credential from the user, wherein the authentication credential is received from one or more user computer system. The invention further comprises receiving a request for a one time credential, wherein the request is received from the one or more user computer systems. The invention also comprises determining when the user is an unauthorized user based on the authentication credential and transmitting an alternative one time credential to the unauthorized user. The invention further comprises receiving the alternative one time credential from the unauthorized user, providing an alternate treatment to the unauthorized user, and capturing unauthorized user information from the unauthorized user based on the alternative one time credential or the alternate treatment.

In other embodiments, the invention further comprises requesting contact information from the unauthorized user to receive the alternative one time credential, receiving the contact information from the unauthorized user, and sending the alternative one time credential based to the unauthorized user based on the contact information received from the unauthorized user.

In further accord with embodiments of the invention, the alternative one time credential is transmitted to the one or more user computer systems from which the authentication credential was received.

In still other embodiments of the invention, the alternative one time credential is transmitted to the one or more user computer systems that is different than the one or more user computer systems from which the authentication credential was received.

In yet other embodiments, the invention further comprises determining alternate treatments previously presented to the unauthorized user, and identifying the alternate treatment to present to the unauthorized user, wherein the alternate treatment is different from the alternate treatments previously presented to the unauthorized user.

In other embodiments of the invention, the alternative one-time credential includes one or more markers. The invention further comprises monitoring actions of the unauthorized user based on the one or more markers associated with the alternative one-time credential, wherein the one or more markers allow identification of the one or more user computer systems or one or more other unauthorized users to which the alternative one time credential is transferred by the unauthorized user.

In further accord with embodiments of the invention, the alternate treatment is providing alternative information to the user. The invention further comprises identifying the information requested by the unauthorized user, identifying alternative information to present to the unauthorized user that corresponds to the information requested, and providing the alternative information to the unauthorized user as the alternate treatment.

In still other embodiments of the invention, the information is user information or user resource pool information, and wherein the alternative information is alternative user information or alternative user resource pool information.

In yet other embodiments of the invention, the alternative information comprises one or more markers. The invention further comprises monitoring actions of the unauthorized user based on the one or more markers associated with the alternative information, wherein the one or more markers allow identification of the one or more user computer systems or one or more other unauthorized users to which the alternative information is transferred by the unauthorized user.

In other embodiments of the invention, the alternate treatment comprises providing alternative information to the unauthorized user on the one or more user computer systems. The invention further comprises identifying an interface in which the unauthorized user is interested, identifying an alternative interface to present to the unauthorized user, and displaying the alternative interface to the unauthorized user.

In further accord with embodiments of the invention, the alternate treatment comprises extending a time for the interaction. The invention further comprises providing an icon to the unauthorized user on the one or more user computer systems indicating that the information is being accessed, and preventing the information from being provided to the unauthorized user on the one or more user computer systems for as long as the unauthorized user maintains the interaction.

In still other embodiments of the invention, the alternate treatment comprises extending a time for the interaction. The invention further comprises placing the unauthorized user on hold, and preventing the unauthorized user on hold from being transferred to a representative for so long as the unauthorized user maintains the interaction.

In yet other embodiments of the invention, the alternate treatment comprises indicating that the requested information is unavailable. The invention further comprises identifying the information in which the unauthorized user has requested, and providing an indication that the information is currently unavailable to the unauthorized user on the one or more user computer systems.

In further accord with embodiments of the invention, the alternate treatment comprises requesting contact information from the unauthorized user. The invention further comprises identifying the information in which the unauthorized user has requested, preventing the information from being provided to the unauthorized user, and requesting the contact information from the unauthorized user in order to provide follow up communication with respect to the information.

In other embodiments of the invention, the alternate treatment comprises transferring the unauthorized user to an alternate channel. The invention further comprises identifying a representative to which to transfer the unauthorized user, wherein the representative is trained to respond to unauthorized users, and transferring the unauthorized user to the representative.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
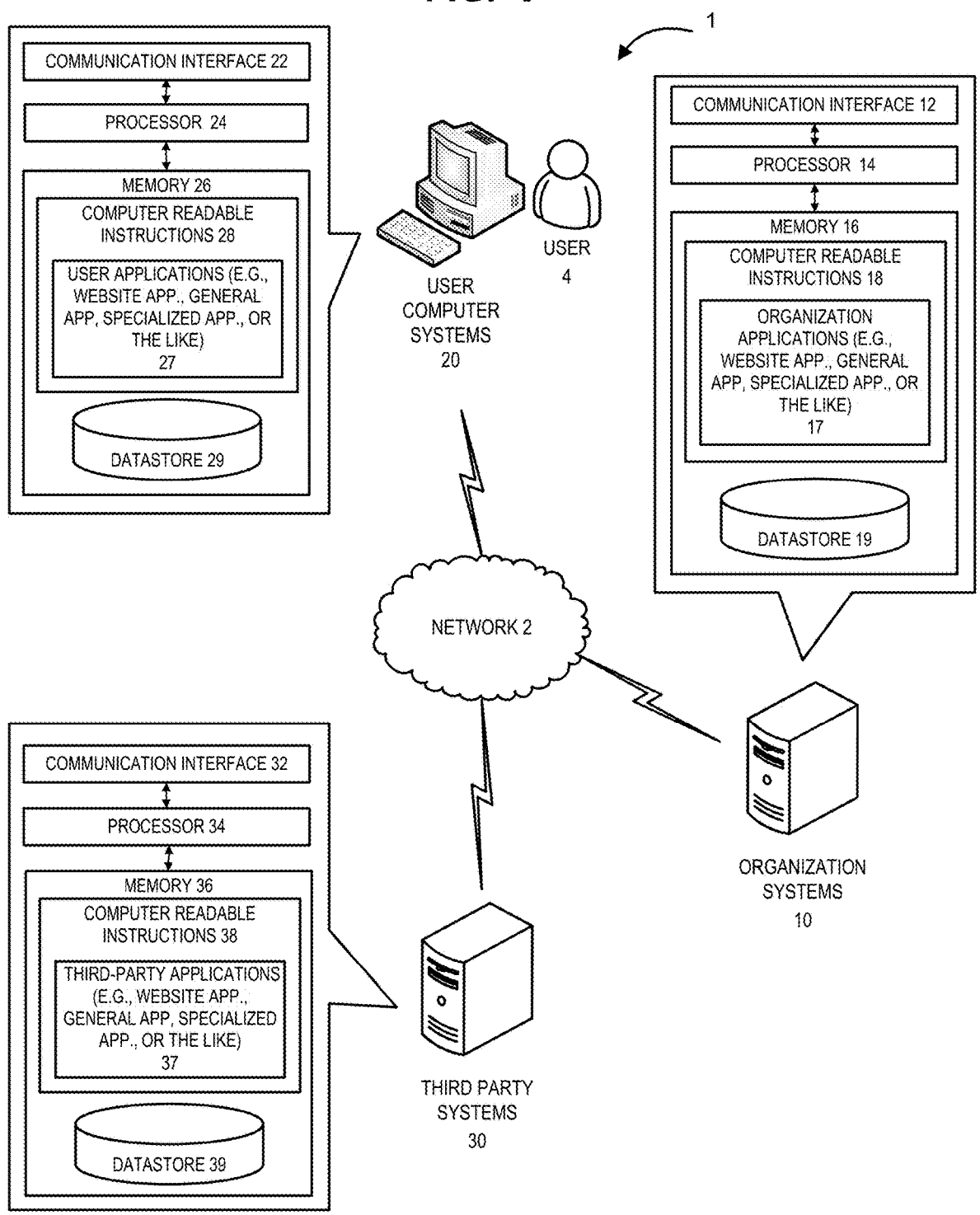

Having thus described embodiments of the invention in general terms, reference will now be made to the accompanying drawings, and wherein:

FIG. 1 illustrates a block diagram of an alternate treatment system environment, in accordance with one or more embodiments of the invention.

Figure 2:
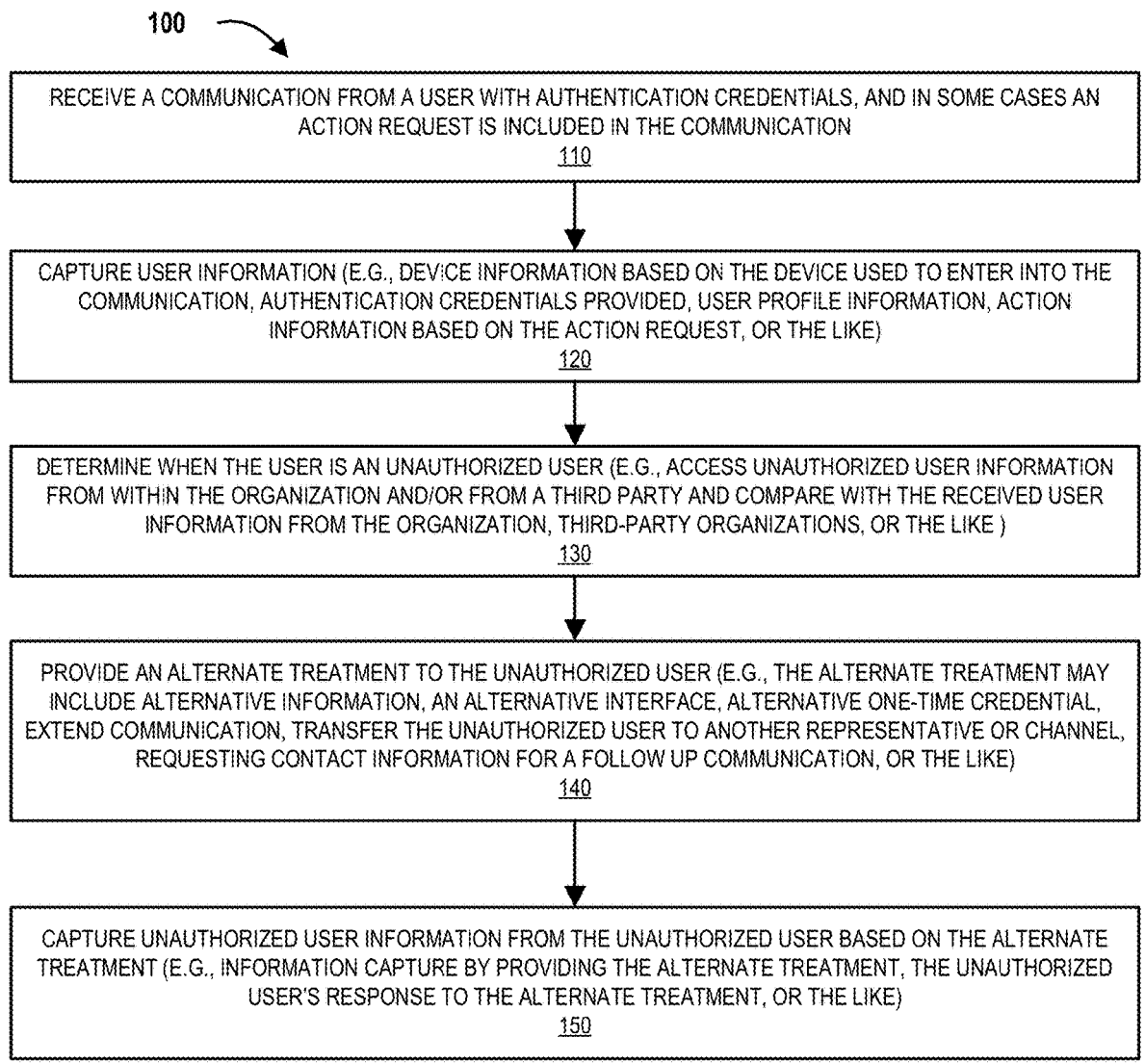

FIG. 2 illustrates a high level process flow for an alternate treatment for routing for unauthorized users, in accordance with one or more embodiments of the invention.

Figure 3:
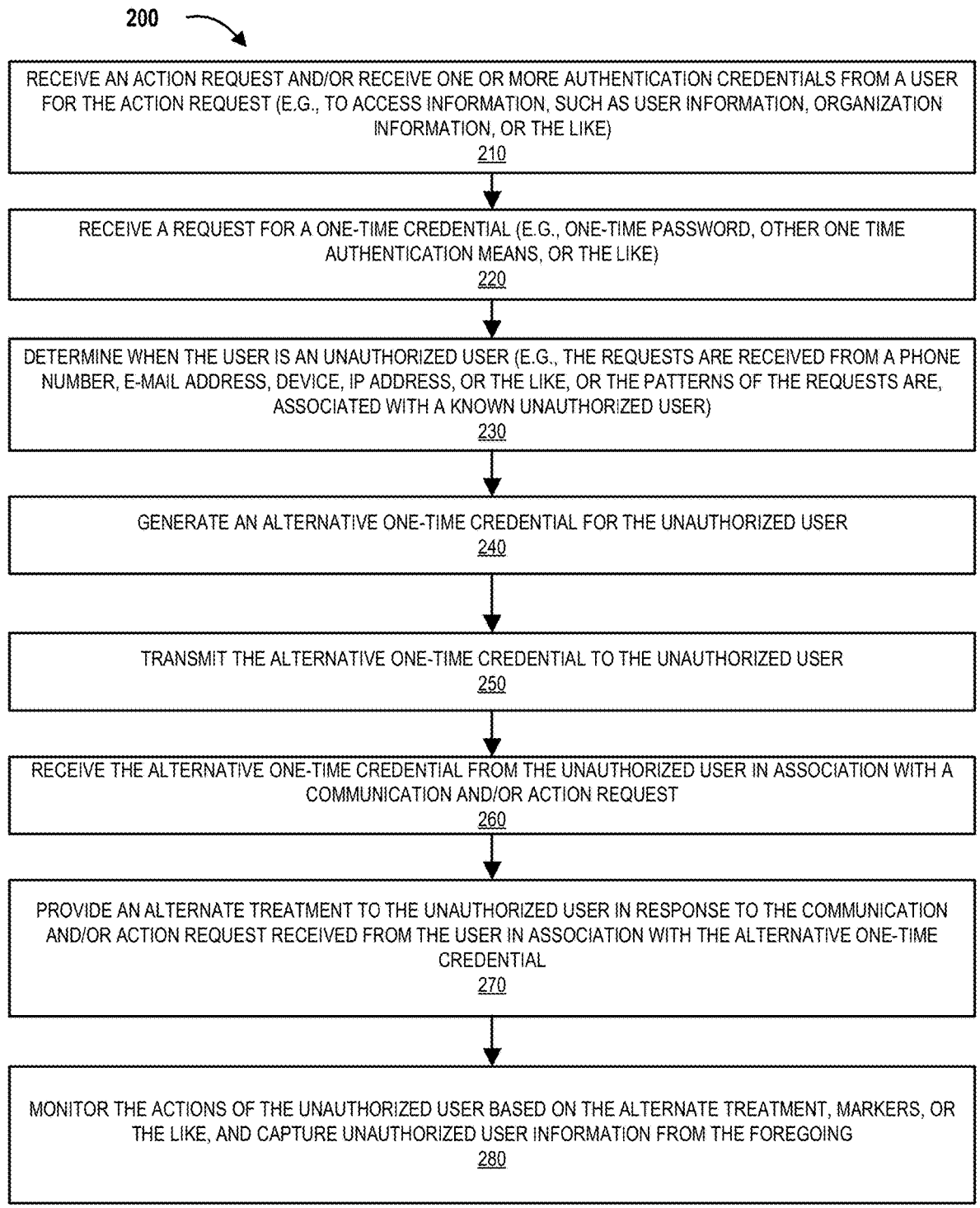

FIG. 3 illustrates a process flow for an alternate user communication routing for a one-time credential for unauthorized users, in accordance with one or more embodiments of the invention.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Systems, methods, and computer program products are herein disclosed for alternate user communication routing for a one-time credential. For example, when a user is determined to be an unauthorized user, the unauthorized user may be provided with an alternative one-time credential (e.g., one-time password, or the like) in response to the user trying to take an action (e.g., to access the organization systems in order to access information). The alternative one-time credential may be embedded with markers that allow the organization to monitor the unauthorized user and/or any action requests made through the use of the alternative one-time credential. For example, when the unauthorized user tries to utilize the alternative one-time credential, the organization may identify the user as unauthorized and determine how to respond to the unauthorized user. For the purposes of capturing further information, the organization may request a separate channel of communication be used to transmit the alternative one-time credential, such as in a two factor authentication process. The organization may request an alternate email, telephone number, or the like to transmit the alternative one-time credential and may subsequently log the email address, telephone number, or the like in the unauthorized user's information for later reference and identification purposes. It should be understood, that the use of the alternative one-time credential allows the organization to more easily identify unauthorized users (e.g., in future requests from the unauthorized users, or the like), track the actions of the unauthorized users (e.g., through markers in the alternative one-time credential, or the like), and/or prevent unauthorized access by the unauthorized users (e.g., prevent the unauthorized user from access the requested information, or the like). In addition to the alternative one-time credential, one or more additional alternate treatments may be presented to the unauthorized users in order to identify, track, and/or prevent access by unauthorized users. The alternate treatments for unauthorized users discussed herein improve the security of the organizations systems by providing alternate treatments to unauthorized users in a way that randomizes how unauthorized users are treated, which deters the unauthorized users from being able it identify how they will be treated and develop responses for the alternate treatments.

FIG. 1 illustrates an alternate treatment system environment 1, in accordance with embodiments of the invention. As illustrated in FIG. 1, one or more organization systems 10 are operatively coupled, via a network 2, to one or more user computer systems 20 (e.g., authorized user systems and/or unauthorized user systems), one or more third-party systems 30, and/or one or more other systems (not illustrated). In this way, the organization systems 10 may receive communications, including authentication credentials, or the like, from a user 4 (e.g., one or more associates, employees, agents, contractors, sub-contractors, third-party representatives, customers, or the like), which may be an authorized user or an unauthorized user, and thereafter, utilize the systems and processes described herein to identify unauthorized users, capture additional information for unauthorized users, and/or prevent future actions by unauthorized users. As such, the one or more organization systems 10 may be utilized to identify unauthorized users and take actions in order to capture unauthorized user information from the unauthorized users through communication with the user computer systems 20, the third party systems 30, and/or the other systems, as will be discussed in further detail herein. As such, embodiments of the present invention allow for improved security through improved identification and monitoring of unauthorized users.

The network 2 illustrated in FIG. 1 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the one or more organization systems 10 generally comprise one or more communication components 12, one or more processor components 14, and one or more memory components 16. The one or more processor components 14 are operatively coupled to the one or more communication components 12 and the one or more memory components 16. As used herein, the term "processor" generally includes circuitry used for implementing the communication and/or logic functions of a particular system. For example, a processor component 14 may include a digital signal processor, a microprocessor, and various analog-to-digital converters, digital-to-analog converters, and other support circuits and/or combinations of the foregoing. Control and signal processing functions of the system are allocated between these processor components according to their respective capabilities. The one or more processor components 14 may include functionality to operate one or more software programs based on computer-readable instructions 18 thereof, which may be stored in the one or more memory components 16.

The one or more processor components 14 use the one or more communication components 12 to communicate with the network 2 and other components on the network 2, such as, but not limited to, the one or more user computer systems 20, the one or more third-party systems 30, and/or one or more other systems. As such, the one or more communication components 12 generally comprise a wireless transceiver, modem, server, electrical connection, electrical circuit, or other component for communicating with other components on the network 2. The one or more communication components 12 may further include an interface that accepts one or more network interface cards, ports for connection of network components, Universal Serial Bus (USB) connectors and the like.

As further illustrated in FIG. 1, the one or more organization systems 10 comprise computer-readable instructions 18 stored in the one or more memory components 16, which in one embodiment includes the computer-readable instructions 18 of organization applications 17 (e.g., web-based applications, dedicated applications, specialized applications, or the like that are used to monitor, communicate with, and/or take actions with respect to the authorized users and/or unauthorized users). In some embodiments, the one or more memory components 16 include one or more data stores 19 for storing data related to the one or more organization systems 10, including, but not limited to, data created, accessed, and/or used by the one or more organization applications 17. The one or more organization applications 17 may be applications that are specifically used for providing services to authorized users, for monitoring, communicating with, and/or capturing information from unauthorized users, and/or the like (e.g., by interacting with the user computer systems 20 and user applications 27, the third party systems 30 and third party applications 37, or other systems).

As illustrated in FIG. 1, users 4 may try to access the organization systems 10 in order to access information from the organization systems (e.g., organization information, user information, resource pool information, or the like). In some embodiments the users 4 may be authorized users, such as users that are supposed to have access to the organization systems and/or associated applications, alternatively, the users may be unauthorized users, such as users that are trying to misappropriate information from authorized users, the organization, and/or third-parties, or the like. The users 4 may utilize the user computer systems 20 (e.g., authorized user computer systems or unauthorized user computer systems) to communicate with and/or access information from the organization systems 10. As such, it should be understood that the one or more user computer systems 20 may be any type of device, such as a desktop, mobile device (e.g., laptop, smartphone device, PDA, tablet, watch, wearable device, or other mobile device), server, or any other type of system hardware that generally comprises one or more communication components 22, one or more processor components 24, and one or more memory components 26, and/or the user applications 27 used by any of the foregoing, such as web browsers applications, dedicated applications, specialized applications, or portions thereof.

The one or more processor components 24 are operatively coupled to the one or more communication components 22, and the one or more memory components 26. The one or more processor components 24 use the one or more communication components 22 to communicate with the network 2 and other components on the network 2, such as, but not limited to, the one or more organization systems 10, the one or more third-party systems 30, and/or the one or more other systems. As such, the one or more communication components 22 generally comprise a wireless transceiver, modem, server, electrical connection, or other component for communicating with other components on the network 2. The one or more communication components 22 may further include an interface that accepts one or more network interface cards, ports for connection of network components, Universal Serial Bus (USB) connectors and the like. Moreover, the one or more communication components 22 may include a keypad, keyboard, touch-screen, touchpad, microphone, speaker, mouse, joystick, other pointer, button, soft key, and/or other input/output(s) for communicating with the users 4.

As illustrated in FIG. 1, the one or more user computer systems 20 may have computer-readable instructions 28 stored in the one or more memory components 26, which in one embodiment includes the computer-readable instructions 28 for user applications 27, such as dedicated applications (e.g., apps, applet, or the like), portions of dedicated applications, a web browser or other applications that allow the one or more user computer systems 20 to operate, that allow users 4 to access and/or take various actions with respect to the one or more organizations systems 10 through the use of the one or more user computer systems 20, or the like.

As illustrated in FIG. 1, the one or more third-party systems 30 may communicate with the one or more organization systems 10 and/or the one or more user computer systems 20 directly or indirectly. The one or more third party systems 30, and/or third-party applications 37 thereof, may provide additional information to the one or more organization systems 10. As such, the one or more third-party systems 30 are operatively coupled, via a network 2, to the one or more organization systems 10, the one or more user computer systems 20, and/or the one or more other systems. The one or more third-party systems 30 generally comprise one or more communication components 32, one or more processor components 34, and one or more memory components 36.

The one or more processor components 34 are operatively coupled to the one or more communication components 32, and the one or more memory components 36. The one or more processor components 34 use the one or more communication components 32 to communicate with the network 2 and other components on the network 2, such as, but not limited to, the one or more organization systems 10, the one or more user computer systems 20, and/or the one or more other systems. As such, the one or more communication components 32 generally comprise a wireless transceiver, modem, server, electrical connection, or other component for communicating with other components on the network 2. The one or more communication components 32 may further include an interface that accepts one or more network interface cards, ports for connection of network components, Universal Serial Bus (USB) connectors and the like.

As illustrated in FIG. 1, the one or more third-party systems 30 may have computer-readable instructions 38 stored in the one or more memory components 36, which in some embodiments includes the computer-readable instructions 38 of one or more third party applications 37 that provide user information (e.g., authorized user information and/or unauthorized user information) to the one or more organization systems 10. The access to the one or more third-party systems 30, or applications thereof, may be controlled by the one or more organization systems 10 and/or one or more user computer systems 20, as will be described herein.

Moreover, as illustrated in FIG. 1, the one or more other systems (not illustrated) may be operatively coupled to the one or more organization systems 10, the one or more user computer systems 20, and/or the one or more third-party systems 30, through the network 2. The other systems have features that are the same as or similar to the features described with respect to the one or more organization systems 10, the one or more user computer systems 20, and/or the one or more third-party systems 30 (e.g., one or more communication components, one or more processor components, and one or more memory components with computer-readable instructions of one or more applications, one or more datastores, or the like). Thus, the one or more other systems communicate with the one or more organization systems 10, the one or more user computer systems 20, the one or more third-party systems 30, and/or each other in same or similar way as previously described with respect to the one or more organization systems 10, the one or more user computer systems 20, and/or the one or more third-party systems 30.

FIG. 2 illustrates a high level process flow for an alternate treatment for routing for unauthorized users (e.g., identifying potential unauthorized users and/or providing alternate user treatment routings), in accordance with embodiments of the present invention. Block 110 of FIG. 2 illustrates that the one or more organization systems 10 receive a communication from a user. The communication may include authentication credentials and/or a requested action from the user. It should be understood that the one or more authentication credentials may be any type of authentication credential and/or combination of authentication credentials. For example, in some embodiments, the one or more authentication credentials may include a user identification (e.g., user name, string of characters—numbers, alphabetic and/or symbols, e-mail address, phone number, or the like) and/or a password, computer system identification (e.g., mobile device identifier, laptop device identifier, or the like), biometric identification (e.g., fingerprint, eye scan, facial recognition, or the like), security questions, or the like. Moreover, the requested action may be a request to access information from the organization (e.g., confidential information of the organization, user information, and/or resource information, or the like). For example, the confidential information of the organization may be customer information, organization operational information, organization resource information, or the like. In other examples, the user information may be personal information of a particular user, such as a customer, employee, representative, or the like (e.g., user information, such as legal name, SSNs, addresses, phone numbers, or the like), while the user resource information may include resource pool information for the resource pools of the user (e.g., resource pool numbers, resource pool balances, resource pool interactions, such as transactions for products—goods and/or services, transfers, withdrawals, deposits, related resource pools and associated resource pool information from within the organization or with third-parties link together, or the like). It should be understood that as discussed herein, when an authorized user and/or a unauthorized user takes an action or initiates any form of communication, it may be performed by the authorized user and/or unauthorized user, or it may be performed by the authorized user computer system 20 and/or unauthorized user computer system 20, and/or other third-party system 30 for the authorized user and/or the unauthorized user.

Block 120 of FIG. 2 illustrates that user information and/or user computer system information is captured from the user. This information can be used by the organization systems 10 to determine the identity of the user entering into the communication, making an action request, and/or taking the action and may be compared to data in the datastore 19 in order to determine if the user 4 or user computer system 20 has previously communicated with and/or made an action request from the organization systems 10. For example, the one or more organization systems 10 may utilize user information, computer system information, or the like that is captured from the user 4 and/or user computer systems 20 from the communication from the user 4 in order to determine the identity of the user 4 entering into the communication. The identity of the user 4 entering into the communication may be associated with other information stored by the organization systems 10, such as other authentication credentials, previous actions of the user, one-time credentials previously presented to the user, resource pool information, user profile information, and the like. In addition, the organization systems 10 may communicate the captured information to third party systems 30 for further data sharing and identification capabilities (e.g., share captured information with third-parties in order to determine if the user has been identified by another organization). In some embodiments, there may be a channel of communication established over network 2 between one or more third-party systems 30 and/or organization systems 10 to share information and enhance the ability of both systems to identify the users and/or user computer systems 20 based on the captured information.

FIG. 2 illustrates in block 130 that the one or more organization systems 10 may determine if the user is an unauthorized user by comparing the user information and/or user computer system information captured from the user 4 with stored information about unauthorized users. In some examples, the one or more organization systems 10 may access information regarding unauthorized users (e.g., a databases of unauthorized users and associated numbers, addresses, e-mail accounts, IP addresses, computer system identifications, Wifi identifiers, or other like information stored that may be related to identified unauthorized users). In other examples, patterns may be stored for unauthorized users that illustrate user actions over time that may indicate that the user 4 in the present communication may potentially be an unauthorized user. For example, if the same system (e.g., based on IP address, phone number, or other system identifier) tries to access multiple accounts of different users within a time period (e.g., access three different user resource pools within 15 minutes, or the like) the system may be identified as an unauthorized user computer system. It should be understood, the determination of the whether or not the user 4 and/or user computer system 20 is an authorized user and/or unauthorized user computer system may be based on the rules determined by each organization. For example, each organization may determine what user information, computer system information, and/or patterns of each user 4 may identify the user 4 as potentially an unauthorized user.

In some embodiments, a user 4 may have an established history of communicating over a particular channel (e.g., telephone, chat, e-mail, Internet phone, website, online portal, or the like) and/or with third party systems 30 that may indicate a pattern of unauthorized activity, and the third party systems 30 may share this information over network 2 with the organization systems 10. In some embodiments, the third party systems 30 may be other organizations that are in the same business or industry as the organization, and thus, may share information in order to identify unauthorized users. In other embodiments, third party systems 30 may represent a specialized organizations, such as an investigative agency that has identified unauthorized user activity associated with specific user information, user computer information, and/or user behavior patterns. The data associated with specific user information, user computer information, and user behavior patterns may exist solely with the organization systems 20 or third party systems 30, and/or may be exist with both parties. In some instances accessing user information from third parties may require the organization systems 10 to initiate a request for third party verification or correlation of captured user information over the network 2.

Block 140 of FIG. 2 illustrates that in response to determining that the user 4 involved in the communication is, or is potentially, an unauthorized user, the one or more organization systems 10 may provide an alternate treatment (e.g., randomized treatment, or the like) to the unauthorized user. For example, the alternate treatment may be different than what treatment would be provided to an authorized user, or what treatment may be typically provided to an unauthorized user (e.g., ending the communication with the unauthorized user). In some embodiments, the alternate treatment provided by the organization systems 10 may be randomized from a group of possible alternate treatments. In this way, the unauthorized user is prevented from preparing for or anticipating the alternate treatment. It should be understood that the alternate treatment may be based on the communication channel through which the unauthorized user is entering into the communication (e.g., call—Internet or telephone call, Internet chat, request made through a portal provided over the Internet, or the like); the request the unauthorized user is making (e.g., request to access confidential information, request to change a password, request to change contact information, request to enter into an interaction—from a specific resource pool, for a resource amount, to an associated resource pool, or the like); the identity of the user (e.g., if the unauthorized user can be identified as a specific repeat unauthorized user to which alternate treatments have been previously provided); or the like.

In some embodiments, the alternate treatment presented to an unauthorized user may be further based on a determination of what one or more alternate treatments were previously presented to the unauthorized user. For example, if the last time the unauthorized user communicated over a telephone call, the unauthorized user was placed on hold for an extended period of time (e.g., 2, 3, 4, 5, 10, or the like times the normal wait time), the next time the unauthorized user is identified, the unauthorized user may be transferred to one or more different representatives (e.g., to extend the communication time of the unauthorized user), while the next time the unauthorized user is identified, an indication may be provided to the unauthorized user that particular features related to the unauthorized user's action request are not currently available. As such, the alternate treatments presented to the unauthorized user may morph based on the action requests of the unauthorized user and the alternate treatments previously presented to the unauthorized user.

It should be understood that in the situations where a representative of the organization is communicating with the unauthorized user, the representative may or may not know that the unauthorized user has been identified as unauthorized (e.g., potentially unauthorized or confirmed as unauthorized). In some instances it may be beneficial for the representative to be unaware that the unauthorized user is unauthorized because the representative may be unfamiliar with handling unauthorized users. As such, in some embodiments, the one or more organization systems 10 may provide recommended alternate treatments (e.g., escalation to a particular group of representatives that handle potential misappropriation, extension of the communication, recommended inquires to ask the unauthorized user, or the like) without indicating to the representative the reason for the recommended alternate treatment. In other embodiments, the representative may be aware that the unauthorized user has been identified as unauthorized. In some embodiments, if the representative is aware that the unauthorized user is unauthorized then the representative may be able to apply specific alternate treatments based on the communication with the unauthorized user.

Block 150 of FIG. 2 further illustrates that the one or more organization systems 10 capture information from the unauthorized user based on the unauthorized user's responses to the alternate treatment. As will be discussed above, and in further detail below, the alternate treatment may be implemented not only to prevent the unauthorized user from realizing that the unauthorized user has been detected, but also to monitor the unauthorized user in order to capture information from the unauthorized user that may help to identify other unauthorized users and/or deter (e.g., reduce or prevent) further unauthorized access. For example, the one or more organization system 10 may be able to capture other personal information from the unauthorized user, may be able to determine how the unauthorized user operates based on alternative information, and/or may be able to determine other resource pools and/or other unauthorized users that the unauthorized user communicates with and/or transacts with.

As will be described in further detail herein, the one or more organization systems 10 gain advantages from randomizing the alternate treatments provided to the unauthorized users. For instance, if the organization systems 10 provides randomized alternate treatments, the unauthorized users are not able to decipher a specific set of treatments to routinely expect from the organization systems 10. As such, the unauthorized users are not able to discern whether or not they have been detected as unauthorized based on the treatment pattern alone. Additionally, the unauthorized users may not have the information required by every specific alternate treatment possibility, and therefore, the task of additional verification for suspected unauthorized users includes an additional level of complexity. Furthermore, the organization system 10 may gain a better understanding of the authorized user by observing genuine reactions from the unauthorized users which are prompted by the randomized alternate treatments. For instance, the unauthorized user may have a scripted or recorded response to a certain treatment for which they expect to be provided from the system at a certain point in the authorization process. By randomizing the alternate treatments provided to suspected or confirmed unauthorized users, the system may place the user in a situation where they must revert to producing an original response. This allows for additional data points to be collected by the organization system 10 in order to analyze the behavior and activity patterns of specific unauthorized users. These additional data points allow the organization system to categorize the unauthorized user in more detail and later identify the unauthorized user with a higher degree of confidence.

Types of potential alternate treatments for unauthorized users are described in further detail below; however, it should be understood that the potential alternate treatments discussed below are not an exhaustive list of potential alternate treatments.

In some examples, the unauthorized user may enter into a communication through a call (e.g., telephone call, Internet call, or the like), prompting the one or more organization systems 10 to provide an alternate treatment of placing the unauthorized user on hold for an extended period of time (e.g., 2, 3, 4, 5, 6, 7, 8, 9, 10, times the normal hold time for an authorized user). The increased hold time may allow the one or more organization systems 10 to gather more information about the user, or may deter the user from continuing an attempt at unauthorized access. The length of the hold time may be varied by the systems 10 in order to give the appearance that the hold times are naturally based on a high volume of communications with respect to a limited amount of available resources. At some time before or during the hold period, the one or more organization systems 10 might also request additional contact information for the unauthorized user and suggest to contact the user at the end of the hold period for the convenience of the unauthorized user. In this instance, the offer to contact the unauthorized user in the future is made with the objective in mind of obtaining more usable information about the identified unauthorized user (e.g., additional contact information, such as additional phone numbers, e-mail addresses, or the like).

In other examples, the alternate treatment that is presented to the unauthorized user may be an indication that the organization has to investigate the request of the unauthorized user, or that the organization has completed the request from the unauthorized user, and as such the organization systems 10 may provide a request identifier (e.g., ticket number, request number, or the like) to the unauthorized user for future reference. The request identifier may be a specific number that the organization systems 10 recognize as being associated with an unauthorized user. For example, should the unauthorized user utilize the request identifier in the future in order to check on the status of an action request made by the unauthorized user and/or use the request identifier in order to repeat a previous action request then the organization systems 10 can automatically identify the user as an unauthorized user based on the request identifier provided by the unauthorized user.

As another example, after determining that an unauthorized user has made an action request to access particular information, the organization may provide alternative information (e.g., alternative information may include imitation information, randomly generated information, adversarial information, or the like, such as fake information that has no actual meaning). For example, if an unauthorized user is requesting information related to a resource pool, the one or more organization systems 10 may provide alternative resource pool information (e.g., imitation resource pool information, such as imitation balances, merchant interactions, or the like) to the identified unauthorized users (e.g., provide reduced balances, or the like). For example, by providing a reduced resource pool balance than what is actually in the resource pool, it may prevent an unauthorized user from trying to misappropriate the resources from the resource pool (e.g., indicate that the resource pool only has a balance of $15, and thus, not worth the time for an unauthorized user to try to access). In some embodiments, after an unauthorized user is identified a pattern may also be identified for the unauthorized user. The pattern may indicate that the unauthorized user does may take actions within resource pools that have balances below a threshold value.

As such, the random treatment may be to provide an alternative resource pool balance below the threshold value.

In other examples, the one or more organization systems 10 may provide other alternative information to an unauthorized user, such as alternative user information (e.g., alternative user name, or the like, such as imitation name, imitation information and/or randomly generated name or information, or the like), other alternative resource pool information (e.g., alternative linked accounts, or the like, such as imitation linked accounts), alternative interaction information (e.g., alternative transactions, or the like, such as imitation transactions), or the like in order to allow the one or more organization systems 10 to track and/or monitor the unauthorized user. For example, an alternative resource pool interface may be provided that allows the unauthorized user to take actions within the alternative resource pool interface that the unauthorized user believes is real in order to capture other unauthorized users (e.g., names, or the like), other contact information (e.g., e-mail addresses, phone numbers, or the like), and/or other resource pool information (e.g., resource pool numbers, locations, or the like) with which the unauthorized user is trying to interact. For example, the unauthorized user may be trying to transfer alternative resources (e.g., imitation resources, such as fake resources) from the alternative resource pool to an actual resource pool of the unauthorized user. In this way, the unauthorized user is given the impression that they have not been detected, allowing the one or more organization systems 10 to monitor the behavior of the unauthorized users for a longer period of time.

In some embodiments, the alternate treatment may be indicating to the unauthorized user that one or more particular features associated with an action request from the unauthorized user is disabled. In this way, the organization systems may present some of the information (e.g., actual information and/or alternative information) in which the unauthorized user is interested, but not provide the complete set of information. As such, the information provided to the unauthorized user is not useful to the unauthorized user, but may extend the communication with the unauthorized user, and/or may allow the organization to provide additional alternate treatments. For example, in response to indicating that some features are not available the organization may request additional contact information to follow-up with the unauthorized user, may provide a request identifier to track the unauthorized user, may provide alternative information to the user, or the like.

In some embodiments, the alternate treatment may include the systems 10 providing alternative authentication credentials (e.g., incorrect security questions and/or answers, incorrect passwords or user names, or the like) to the unauthorized user. As such, when such alternative authentication credentials is utilized in the future then the unauthorized user may be identified. For example, should the unauthorized user request access the user information, the organization system 10 may present the user with an alternative address, alternative phone number, alternative user identification or the like (e.g., imitation address, imitation phone number, imitation user identification, or the like). As such, should the one or more organization systems 10 receive the alternative address, the alternative phone number, the alternative user identification, or the like, or combinations thereof in the future associated with a request from a user, then the one or more organization systems 10 may be able to identify the user as an unauthorized user. In other examples, should the unauthorized user try to access a user's security questions, the organization may provide alternative security answers to the unauthorized user (e.g., imitation security questions, or the like). As such, when the unauthorized user tries to access information from the organization in the future using the alternative security answers, then the organization systems are able to identify the user as unauthorized and present additional alternate treatments to the unauthorized user and/or capture additional information about the unauthorized user.

As another example alternate treatment, in the instance where the unauthorized user is entering into a communication through a chat over the Internet, the alternate treatment may be the same or similar to the alternate treatment for a telephone call. As such, the alternate treatment may include placing the unauthorized user on hold or an extended period of time, requesting additional contact information, providing alternative resource pool information, providing alternative authentication credentials, providing a request identifier, or other like treatment in order to monitor and capture information from the unauthorized user.

In the instance where the unauthorized user is entering into a communication to access information over the Internet or on a call (e.g., access resource pool information, or the like), the alternate treatment may be extending the time for which a response to the request is instituted (e.g., provide an icon, such as a buffering icon, an error message, or the like), delaying the time for the response in order to identify and/or create an alternative interface to display to the unauthorized user (e.g., alternative interface may include an imitation interface, randomly generally interface, adversarial interface, which may include alternative information, such as imitation information, or the like). For instance, the one or more organization systems 10 may identify a specific user computer that is known to be associated with unauthorized access. As such, in the event that an unauthorized user is attempting to enter into a communication to access a resource pool through an online portal, website, computer program or the like, the one or more organization systems 10 have ample opportunities to stall communication while creating the appearance of naturally occurring communication issues (e.g., buffering, Internet connectivity, or the like). For instance, the response time from the one or more organization systems 10 through an online portal may be reduced to create the appearance of a bad internet connection, overloaded server volume, or browser compatibility issue. In some embodiments, the one or more organization systems 10 may request that the identified unauthorized user attempt to access the online portal using a different Wifi or data connection, and/or different user computer system (e.g., hardware or applications—indicate that the mobile device and/or application do not meet system requirements). Should the unauthorized user utilize a different computer system or connection means, the organization system is able to capture additional information about the unauthorized user. For instance, an unauthorized user may have inadvertently enabled location services for a specific device or application, which these features were disabled in the unauthorized user's primary device or application used to make the initial communication. In other examples, the location of the unauthorized user may be determined if they are required to communication through a particular Wifi connection. In these examples, the alternate treatment increases the likelihood that the systems 10 is able to gather useful information about the unauthorized user and also deters the attempt at unauthorized access while avoiding the appearance that the unauthorized user has been detected.

As other examples of random treatments, in the instance where the unauthorized user is entering into any form of communication with the one or more organization systems 10, the unauthorized user may be provided with an alternative one-time credential (e.g., an alternative one-time credential may include an imitation one-time credential, such as an imitation one-time password, or the like) to access the system. The alternative one-time credential may be embedded with markers that allow the organization systems 10 to monitor the unauthorized user and/or any action requests made through the use of the alternative one-time credential. For example, when the unauthorized user tries to utilize the alternative one-time credential, the organization systems 10 may identify the user as unauthorized and determine how to respond. For the purposes of capturing further information, the one or more organization systems 10 may request a separate channel of communication be used to transmit the alternative one-time credential, such as in a two factor authentication process. The organization system 10 may request an alternate email, telephone number, or the like to transmit the alternative one-time credential and may subsequently log the email address, telephone number and the like within the unauthorized user's information for later reference and identification purposes.

In some embodiments, the alternative one-time credential may trigger an alert on the backend of the one or more organization systems 10 to alert the representative that they are communicating with an unauthorized user. In other embodiments, the triggered alert may not be displayed to the representative communicating with the unauthorized user in order to avoid a change in the particular representative's behavior. In other embodiments, the use of the alternative one-time credential may escalate the communication within the system such that the communication is re-routed to another representative trained to interact with unauthorized users.

In other examples, when the unauthorized user is entering into a communication over a call or Internet chat, the alternate treatment may include the one or more organization systems 10 requesting that the unauthorized user call back using a different telephone number, communicate using a different user computer system 10 or application, or the like. The systems 10 may defer to a number of reasons to justify this request, including a "poor connection," low audio quality, issues hearing the user, a policy restriction on communicating via a particular channel (e.g., a blocked phone number, private phone number, or the like). In this way, this alternate treatment increases the likelihood that the user will provide additional information that the systems 10 may retain for the user's information for later reference and identification purposes.

In some embodiments, the one or more organization systems 10 may request that the unauthorized user provide additional information related to the user information in order to proceed. For example, the organization systems 10 may request a specific piece of information that the unauthorized user already knows in order to create a false sense of confidence in the unauthorized user that they have bypassed an additional level of security. In some instances, the organization systems 10 may vary the request for additional information such that the unauthorized user is required to make several access attempts before they are allowed to succeed. This manufactured trial and error situation via alternate treatment increases the likelihood that the unauthorized user genuinely believes they have bypassed the system security undetected, when in reality the one or more organization systems 10 are aware that the user is unauthorized and instead using the increased communication to gather more potentially useful information about the unauthorized user.

As discussed herein, it should be understood that markers may be utilized along with information presented to the unauthorized user (e.g., the alternative information, the request identifiers, the alternative one-time credential, or the like). For example, should the unauthorized user request user information, security information, resource pool information, or the like, the one or more organization systems 10 may provide alternative user information, alternative security information, alternative resource pool information, or the like along with embedded markers that allow the organization systems 10 to track where such alternative information is sent and/or used.

It should be understood that all of the potential alternate treatments have not been discussed, and the alternate treatments may change over time for the same unauthorized user and/or based on the type of action request made by the unauthorized user. In addition, the alternate treatment for a user may change if multiple unauthorized users or user computers are recognized by the one or more organization systems 10 as being associated. For instance, the one or more organization systems 10 would avoid providing the same alternate treatment to two unauthorized users that may be related (e.g., of the same group). However, the recognition that two users are operating as a group may also prompt the one or more organization systems 10 to include some level of consistency in the alternate treatments to each of the users to provide a false sense that the unauthorized users have successfully misappropriated information from the one or more organization systems 10. As an example, two unauthorized users operating in a group may both attempt to access the same resource pool information. In this situation, it would be ideal for the organization systems 10 to display the same credentials, resource pool amounts, alternative information, or the like (e.g., even if the information is fake) in order to avoid indicating to the users that the organization systems 10 are displaying different credentials, resource pool amounts, or the like.

In order to prevent the unauthorized user from realizing that the unauthorized user has been identified as unauthorized, the alternate treatments may allow some of the unauthorized user's requests in order to capture more information about the unauthorized user. For example, in order to capture more information from the unauthorized user, such as the other unauthorized users and/or the resource pools that the unauthorized user may utilize, the organization systems 10 may allow particular action requests. The allowed action requests may include providing the alternative information described herein, but in some embodiments the allowed action requests may include allowing some of the unauthorized user requests. For example, the organization may allow the transfer of some information or set up pending resource transfers if the unauthorized user is making transfers within the databases of the organization (e.g., resource transfers between resource pools within the organization, or the like). As such, the organization systems 10 may allow the unauthorized user to access non-confidential information and/or illustrate that the unauthorized user may be successful (e.g., providing confirmation notifications that make it appear that the user request has occurred) in order to capture additional information from the unauthorized user or the unauthorized user's associates.

In some embodiments, the one or more organization systems may provide a notification (e.g., on an interface provided to the unauthorized user over the Internet, over a call with a representative, or the like), indicating that the unauthorized user's request was allowed. However, in the future, the organization systems 10 may provide follow-up communication with the unauthorized user indicating that the request did not occur because of a particular reason (e.g., unavailable resources, application errors, or other like notifications that the request did not process for a specific reason). The follow-up notification may include a request for the unauthorized user to contact the organization, or representative thereof, and in response additional information may be captured from the unauthorized user. For example, the one or more organization systems 10 may be able to capture additional contact information (e.g., phone number, computer IP address, e-mail, or the like), that the unauthorized user may be using in order to follow up with the organization.

Generally, it should be understood that the organization will provide random alternate treatments for handling an unauthorized user. In some embodiments, the organization would create random responses to the unauthorized user such that the unauthorized user does not know that he/she has been identified as an unauthorized user, and/or is unable to determine how he/she is going to be treated by the organization. As such, if the unauthorized user is unaware of whether or not the organization has identified the unauthorized user as unauthorized, and the unauthorized user is unable to predict how the organization with handle the unauthorized user for specific requests, then the unauthorized user is less likely to develop and implement responses to misappropriate information from the organization or its authorized users. It should be further understood that it may be beneficial to prevent the unauthorized user from knowing that he/she has been identified as unauthorized because should the unauthorized user realize that the unauthorized user has been identified as unauthorized, then the unauthorized may be just end the communication (e.g., call or other action occurring through a portal, or the like) with the organization and create a new communication with the organization through a different channel (e.g., move from phone interaction to Internet interaction, or the like) or a different contact through the same channel (e.g., new phone, new computer system, new IP address, or the like).

FIG. 3 illustrates a process flow for an alternate user communication routing for a one-time credential for unauthorized users, in accordance with one or more embodiments of the invention. As illustrated by block 210 in FIG. 3, a request for information is received from a user, and such request includes authentication credentials of the user and/or a user computer system 20. It should be understood that when discussing the user 4 herein, such reference may indicate the user or the user computer system 20 associated with the user (e.g., receive a request from a user may include receiving the request from the user computer system 20). Additionally, with respect to the user's actions, the user's actions may be replaced by the actions of a system that is performing something on behalf of the user or user computer system 20 (e.g., third-party systems 30 and/or other systems may take an action on behalf of the user or organization system). Moreover, it should be understood that the one or more authentication credentials may be any type of authentication credential and/or combination of authentication credentials. For example, in some embodiments the one or more authentication credentials may include a user identification (e.g., user name, string of characters—numbers, alphabetic and/or symbols, e-mail address, phone number, or the like) and/or a password, computer system identification (e.g., mobile device identifier, laptop device identifier, or the like), biometric identification (e.g., fingerprint, eye scan, facial recognition, or the like), security questions, or the like, and/or a combination thereof.

It should be further understood that as described herein, the information being accessed using the one or more authentication credentials from the user 4 may relate to any type of secure data, such as but not limited to technological data, client data, customer data, personal data, or the like. In some embodiments the secure data my include resource pool data of the user (e.g., financial account data of the user). As such, the user 4 may be accessing the user's own resource pools to take an action (e.g., review, transfer, assign, or the like) with respect to the user's resources within the user's resource pool (e.g., user's funds). In other examples, the information being accessed is a request to access user information, such as user passwords, user preferences, or the like (e.g., a request for a password reset, or the like). Moreover, it should be understood that the request to access information may include a request to change some of the information (e.g., change user contact, user password, or the like). It should also be understood that the request for accessing the information may come from a user 4 that is an authorized user or an unauthorized user. As such, the user 4 may be an authorized user or the user 4 may be an unauthorized user using the one or more authentication credentials, as will be described herein.

Block 220 of FIG. 3 illustrates that a request is received by the one or more organization systems 10 for a one-time credential (e.g., one time password, or other one-time identification). It should be understood, as described above, that the one-time credential may be utilized to change a user password, verify an action (e.g., verify a transfer of resources, or the like), or access other information (e.g., user information, or the like as described herein), or take any other action. It should be understood that the one-time credential may be sent to the user through the same or a separate channel from which the user 4 initiated the communication and/or sent the one or more authentication credentials. For example, the user 4 may provide authentication credentials to access information through a desktop computer and the request may include a request to provide the one-time credential through the user's mobile device. The one time credential may be utilized to provide additional security to the information that the user is trying to access.

FIG. 3 illustrates in block 230 that the one or more organization systems 10 determine when the user is an authorized user or an unauthorized user. For example, the one or more organization systems 10 may utilize user information, computer system information, stored information about a plurality of unauthorized users, patterns of the user and/or unauthorized user, or the like to determine if the user 4 making the request is an unauthorized user. The determination of whether or not the user is an unauthorized user or an authorized user is described generally in block 130 of FIG. 2, and in further detail with respect to co-pending U.S. patent application Ser. No. 15/995,824 entitled "Alternate User Communication Routing Utilizing a Unique User Identification" filed concurrently herewith, and incorporated by reference herein in its entirety.

Returning to FIG. 3, as illustrated in block 240 in response to determining that the user is an unauthorized user, the one or more organization systems 10 generates an alternative one-time credential. It should be further understood that the alternative one-time credential will not allow the unauthorized user to access the information in which the unauthorized user may be interested, but instead may be an alternate treatment or be utilized to provide one or more alternate treatments to the unauthorized user. It should be understood that the one or more alternate treatments may be the treatments discussed with respect to FIG. 2 described herein, and/or the one or more alternate treatments described in further detail with respect to co-pending U.S. patent application Ser. No. 15/995,830 entitled "Alternate User Communication Routing" filed concurrently herewith, and incorporated by reference herein in its entirety. As discussed, the alternate treatments may include presenting the unauthorized user an alternative display, keeping the user on an communication longer (e.g., Internet chat, telephone call, or the like), extending the response time, providing an icon indicating an issue access the information (e.g., a buffering icon, working icon, or the like that indicates the system is performing a function), or the like.

It should be understood that that the alternative one-time credential may be pre-determined or may be created once the user 4 is identified as being an unauthorized user. As such, the alternative one-time credential may be stored in an alternative one-time credential databases and used as necessary, or an alternative one-time credential generator (e.g., application or the like) may generate alternative one-time credentials as needed. Moreover, the alternative one-time credential may be specific for a specific type of alternate treatment or may be assigned to an alternate treatment. As will be described in further detail later, the alternative one-time credential my include markers, which may be used in order track the unauthorized user's use of the alternative one-time credential.

The alternative one-time credential is then transmitted to the unauthorized user, as illustrated in block 250 of FIG. 3. For example, if the unauthorized user requests the one-time credential through a specific channel, the alternative one-time credential may be presented through the requested specific channel (e.g., the unauthorized user's mobile device, or the like). Alternatively, in some embodiments, it should be understood that instead of sending the alternative one-time credential through a pre-determined channel (e.g., stored channel) or through the channel through which the request was made, the organization systems 10 may request the unauthorized user provide user contact information for one or more specific channels. For example, the organization systems 10 may request that the user provide a phone number, e-mail address, or other contact information in order to capture more information about the unauthorized user or the unauthorized user's computer systems 20. Regardless of how the one-time credential is presented it should be understood that, the unauthorized user believes that he/she has successfully received a one-time credential instead of an alternative one-time credential that may be used by the one or more organization systems 10 to track the use of the alternative one-time credential by the unauthorized user.

Block 260 of FIG. 3 illustrates that the one or more organization systems 10 (or other systems) may receive a one-time credential from a user 4 and then determine that the one-time credential is an alternative one-time credential from an unauthorized user (e.g., the unauthorized user that made the initial request or a different unauthorized user). For example, after receiving a one-time credential the one or more organization systems 10 (or other system) may compare the one-time credential with stored one-time credentials (e.g., real and/or alternative). In some embodiments, one-time credential may only work for a short period of time (e.g., seconds, minutes, tens of minutes, hours, or the like), and as such, the list of active one-time credentials may be limited. It should be understood that the alternative one-time credential may be received by the organization system (or another system) from the user computer system 20. It should be understood that the user computer system 20 may be an unauthorized user computer system or an authorized user computer system that is misappropriated by the unauthorized user for purposes of accessing the information (e.g., remotely sending the alternative one-time credential through an authorized user computer system).

FIG. 3 in block 270 further illustrates that the one or more organization systems 10 (or other system), in response to receiving the alternative one-time credential, may provide an alternate treatment to the unauthorized user. It should be understood that the alternate treatments may be any of the alternate treatments described with respect to block 140 from FIG. 2 above, and/or described in co-pending U.S. application Ser. No. 15/995,830 entitled "Alternate User Communication Routing," which is incorporated by reference herein in its entirety.

In some embodiments, the alternate treatment may include accessing and/or generating alternative information to display to the unauthorized user in an alternative display. For example, if the unauthorized user is trying to access resource pool information of an authorized user (e.g., customer) of the organization (e.g., user password, resource pool number, interactions the user made with resources, reduced balances, or the like), then the alternative information may include alternative resource pool information of the customer's resource pool that the organization then provides to the unauthorized user in an alternative interface.

In other embodiments, after determining that the one-time authentication credential received is an alternative one-time authentication credential, the alternate treatment may include providing an icon indicating that the unauthorized user is being routed to the desired information, but purposefully preventing the information from being provided to the unauthorized user. For example, as previously discussed herein the icon may be an alternative icon that indicates that the systems or applications are buffering, working, or other indication that the systems is working. However, the alternative icon only illustrates that the systems is working, but the actual information will never be presented to the unauthorized user. In other embodiments, the alternate treatment may include placing the user on hold, to extend the wait time of the unauthorized user.

In other embodiments, the alternate treatment may include requesting additional information from the unauthorized user about the unauthorized user (e.g., other contact information); requesting resource pool information, user names or other information needed to completed an alternative action for a request (e.g., complete an alternative interaction for the unauthorized user in order to access information about other authorize users, and/or any associated systems and/or resource pools that the unauthorized user is utilizing); or other like alternate treatment discussed herein.

Block 280 of FIG. 3 further illustrates that the unauthorized user may be monitored in a number of different ways. For example, in some embodiments, as previously described above, the alternative one-time credential may include a marker (e.g., metadata, applet, cookie, embedded tag, or other like marker) that allows the organization to track the use of such alternative one-time credential. For example, the one or more organization systems 10 (or other systems) may be able to determine what the unauthorized user does with the one-time credential (e.g., store the alternative one-time credential, send the alternative one-time to another user, uses the alternative one-time credential, or the like). As such, the marker in the alternative one-time credential may allow the organization systems 10 to monitor the unauthorized user or any subsequent unauthorized user that may subsequently receive and/or use the alternative one-time credential. In some examples, the unauthorized user may request the one-time credential from a first computer system, receive the one-time credential at from a second computer system, and utilize the one-time credential from a third computer system. The one or more organizations systems 10 may link the systems and the unauthorized user together (e.g., based on the requests and/or through the use of markers in the alternative one-time credential) in order to use such information for further pattern development associated with the unauthorized user and/or the computer systems.

Alternatively, in other embodiments of the invention, the alternate treatment may further allow the organization systems to monitor the unauthorized user. For example, any alternative information (e.g., including the alternative one-time credential itself) that may be presented to the unauthorized user may be tracked. In some cases the alternative information may be alternative resource pool identifiers (e.g., account numbers), alternative resource pool transactions, alternative authentication credentials, or the like, and the organization systems 10 can determine where the unauthorized user sent and/or used the alternative information. For example, if the unauthorized user provided alternative authentication credentials and/or resource pool identifiers to another unauthorized user, the organization systems 10 can determine when another unauthorized user may have tried to use the alternative authentication credentials and/or resource pool identifiers to transfer resources and/or to enter into interactions without authorization.

Monitoring the actions of the unauthorized user allows the one or more organization systems 10 to capture additional information from one or more of the unauthorized users (e.g., the unauthorized user that requested the alternative one-time credential and/or subsequent unauthorized users that received the alternative one-time credential and/or alternative information from the original unauthorized user). The additional unauthorized user information that is captured may include devices that the one or more unauthorized users may utilize in order to initiate the unauthorized action requests, locations of the unauthorized users and/or devices, the actions that the unauthorized users tried to initiate (e.g., parties involved in an interaction, cost of the interaction, product—good or service, time of the interaction, or the like), other authentication credentials and/or resource pool identifiers associated with the alternative one-time credential and/or alternative resource pool identifiers (e.g., other credentials and/or related resource pool numbers that the unauthorized user may use or try to use in order to transfer resources).

Moreover, the monitoring and additional information captured may allow the organization systems 10 to recognize patterns in the actions of the one or more unauthorized users. The patterns may allow the organization to link past misappropriation to the one or more unauthorized users, predict future misappropriation by the one or more unauthorized users, and/or identify other authentication credentials and/or resource pools of the one or more unauthorized users. As such, the organization systems 10 may be able to identify the actions one or more unauthorized users may take in the future through the use of the patterns, the devices, authentication credentials, and/or resource pools that were identified as being used by the one or more unauthorized users. It should be understood that the unauthorized users and/or unauthorized user actions may be linked together through the use of the one-time authentication credentials. As such, whenever an alternative one-time authentication credential is issued for a particular user, the alternative one-time authentication credential may be linked with previous alternative one-time authentication credentials such that the unauthorized user actions over time may be tracked.

It should be understood, that the systems described herein may be configured to establish a communication link (e.g., electronic link, or the like) with each other in order to accomplish the steps of the processes described herein. The link may be an internal link within the same entity (e.g., within the same financial institution) or a link with the other entity systems. In some embodiments, the one or more systems may be configured for selectively responding to dynamic authentication inquires. These feeds of resource usage and availability may be provided via wireless network path portions through the Internet. When the systems are not providing data, transforming data, transmitting the data, and/or creating the reports, the systems need not be transmitting data over the Internet, although it could be. The systems and associated data for each of the systems may be made continuously available, however, continuously available does not necessarily mean that the systems actually continuously generate data, but that a systems are continuously available to perform actions associated with the systems in real-time (i.e., within a few seconds, or the like) of receiving a request for it. In any case, the systems are continuously available to perform actions with respect to the data, in some cases in digitized data in Internet Protocol (IP) packet format. In response to continuously receiving real-time data feeds from the various systems, the systems may be configured to update actions associated with the systems, as described herein.

Moreover, it should be understood that the process flows described herein include transforming the data from the different systems (e.g., internally or externally) from the data format of the various systems to a data format associated with a particular display. There are many ways in which data is converted within the computer environment. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may convert to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art in view of this disclosure, embodiments of the invention may be embodied as an apparatus (e.g., a system, computer program product, and/or other device), a method, or a combination of the foregoing. Accordingly, embodiments of the invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the invention may take the form of a computer program product comprising a computer-usable storage medium having computer-usable program code/computer-readable instructions embodied in the medium (e.g., a non-transitory medium, or the like).

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the invention may be written in an object oriented, scripted or unscripted programming language such as Java, Pearl, Python, Smalltalk, C++ or the like. However, the computer program code/computer-readable instructions for carrying out operations of the invention may also be written in conventional procedural programming languages, such as the "C" programming language or similar programming languages.

Embodiments of the invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Specific embodiments of the invention are described herein. Many modifications and other embodiments of the invention set forth herein will come to mind to one skilled in the art to which the invention pertains, having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

INCORPORATION BY REFERENCE

To supplement the present disclosure, this application further incorporates entirely by reference the following commonly assigned patent applications:

| U.S. patent application Ser. No. | Title | Filed On |
| --- | --- | --- |
| 15/995,830 | ALTERNATE USER COMMUNICATION ROUTING | Concurrently herewith |
| 15/995,824 | ALTERNATE USER COMMUNICATION ROUTING UTILIZING A UNIQUE USER IDENTIFICATION | Concurrently herewith |
| 15/995,837 | ALTERNATE DISPLAY GENERATION BASED ON USER IDENTIFICATION | Concurrently herewith |
| 15/995,894 | ALTERNATE USER COMMUNICATION HANDLING BASED ON USER IDENTIFICATION | Concurrently herewith |

What is claimed is:

1. A system for providing alternate treatments for interactions with unauthorized users, the system comprising:
   one or more memories having computer readable code stored thereon; and
   one or more processors operatively coupled to the one or more memories, wherein the one or more processors are configured to execute the computer readable code to:
      receive a request from a user to access information;
      receive an authentication credential from the user, wherein the authentication credential is received from one or more user computer system;
      receive a request for a one time credential, wherein the request is received from the one or more user computer systems;
      determine when the user is an unauthorized user based on the authentication credential;
      transmit an alternative one time credential to the unauthorized user;
      receive the alternative one time credential from the unauthorized user;
      provide an alternate treatment to the unauthorized user, wherein the alternate treatment is providing alternative information to the unauthorized user and wherein providing the alternative information comprises:
         identifying the information requested by the unauthorized user;
         identifying the alternative information to present to the unauthorized user that corresponds to the information requested by the unauthorized user; and providing the alternative information to the unauthorized user as the alternate treatment; and capture unauthorized user information from the unauthorized user based on the alternative one time credential or the alternate treatment.

2. The system of claim 1, wherein the one or more processors are further configured to execute the computer readable code to:

request contact information from the unauthorized user to receive the alternative one time credential;

receive the contact information from the unauthorized user; and send the alternative one time credential based to the unauthorized user based on the contact information received from the unauthorized user.

3. The system of claim 1, wherein the alternative one time credential is transmitted to the one or more user computer systems from which the authentication credential was received.

4. The system of claim 1, wherein the alternative one time credential is transmitted to the one or more user computer systems that is different than the one or more user computer systems from which the authentication credential was received.

5. The system of claim 1, wherein the one or more processors are further configured to execute the computer readable code to:

determine the alternate treatments previously presented to the unauthorized user; and identify the alternate treatment to present to the unauthorized user, wherein the alternate treatment is different from the alternate treatments previously presented to the unauthorized user.

6. The system of claim 1, wherein the alternative one time credential includes one or more markers, and wherein the one or more processors are further configured to execute the computer readable code to:

monitor actions of the unauthorized user based on the one or more markers associated with the alternative one time credential, wherein the one or more markers allow identification of the one or more user computer systems or one or more other unauthorized users to which the alternative one time credential is transferred by the unauthorized user.

7. The system of claim 1, wherein the information is user information or user resource pool information, and wherein the alternative information is alternative user information or alternative user resource pool information.

8. The system of claim 1, wherein the alternative information comprises one or more markers, and wherein the one or more processors are further configured to execute the computer readable code to:

monitor actions of the unauthorized user based on the one or more markers associated with the alternative information, wherein the one or more markers allow identification of the one or more user computer systems or one or more other unauthorized users to which the alternative information is transferred by the unauthorized user.

9. The system of claim 1, wherein the alternate treatment comprises providing alternative information to the unauthorized user on the one or more user computer systems, wherein the one or more processors are further configured to execute the computer readable code to:

identify an interface in which the unauthorized user is interested;

identify an alternative interface to present to the unauthorized user; and display the alternative interface to the unauthorized user.

10. The system of claim 1, wherein the alternate treatment comprises extending a time for an interaction, wherein the one or more processors are further configured to execute the computer readable code to:

provide an icon to the unauthorized user on the one or more user computer systems indicating that the information is being accessed; and prevent the information from being provided to the unauthorized user on the one or more user computer systems for as long as the unauthorized user maintains the interaction.

11. The system of claim 1, wherein the alternate treatment comprises extending a time for an interaction, wherein the one or more processors are further configured to execute the computer readable code to:

placing the unauthorized user on hold; and prevent the unauthorized user on hold from being transferred to a representative for so long as the unauthorized user maintains the interaction.

12. The system of claim 1, wherein the alternate treatment comprises indicating that the information requested is unavailable, wherein the one or more processors are further configured to execute the computer readable code to:

identify the information the unauthorized user has requested; and provide an indication that the information is currently unavailable to the unauthorized user on the one or more user computer systems.

13. The system of claim 1, wherein the alternate treatment comprises requesting contact information from the unauthorized user, wherein the one or more processors are further configured to execute the computer readable code to:

identify the information the unauthorized user has requested;

prevent providing the information to the unauthorized user; and request the contact information from the unauthorized user in order to provide follow up communication with respect to the information.

14. The system of claim 1, wherein the alternate treatment comprises transferring the unauthorized user to an alternate channel, wherein the one or more processors are further configured to execute the computer readable code to:

identify a representative to which to transfer the unauthorized user, wherein the representative is trained to respond to the unauthorized users; and transfer the unauthorized user to the representative.

15. A computer implemented method for providing alternate treatments for interactions with unauthorized users, the method comprising:

receiving, by one or more processors, a request from a user to access information;

receiving, by the one or more processors, an authentication credential from the user, wherein the authentication credential is received from one or more user computer system;

receiving, by the one or more processors, a request for a one time credential, wherein the request is received from the one or more user computer systems;

determining, by the one or more processors, when the user is an unauthorized user based on the authentication credential;

transmitting, by the one or more processors, an alternative one time credential to the unauthorized user;

receiving, by the one or more processors, the alternative one time credential from the unauthorized user;

providing, by the one or more processors, an alternate treatment to the unauthorized user, wherein the alternate treatment is providing alternative information to the unauthorized user and wherein providing the alternative information comprises:

identifying the information requested by the unauthorized user;

identifying the alternative information to present to the unauthorized user that corresponds to the information requested by the unauthorized user; and providing the alternative information to the unauthorized user as the alternate treatment; and capturing, by the one or more processors, unauthorized user information from the unauthorized user based on the alternative one time credential or the alternate treatment.

16. The method of claim 15, wherein the one or more processors are further configured to execute the computer readable code to:

request contact information from the unauthorized user to receive the alternative one time credential;

receive the contact information from the unauthorized user; and send the alternative one time credential based to the unauthorized user based on the contact information received from the unauthorized user.

17. The method of claim 15, wherein the alternative one time credential includes one or more markers, and wherein the one or more processors are further configured to execute the computer readable code to:

monitor actions of the unauthorized user based on the one or more markers associated with the alternative one time credential, wherein the one or more markers allow identification of the one or more user computer systems or one or more other unauthorized users to which the alternative one time credential is transferred by the unauthorized user.

18. A computer program product for providing alternate treatments for interactions with unauthorized users, the computer program product comprising at least one non-transitory computer-readable medium having computer-readable program code portions embodied therein, the computer-readable program code portions comprising:

an executable portion configured to receive a request from a user to access information;

an executable portion configured to receive an authentication credential from the user, wherein the authentication credential is received from one or more user computer system;

an executable portion configured to receive a request for a one time credential, wherein the request is received from the one or more user computer systems;

an executable portion configured to determine when the user is an unauthorized user based on the authentication credential;

an executable portion configured to transmit an alternative one time credential to the unauthorized user;

an executable portion configured to receive the alternative one time credential from the unauthorized user;

an executable portion configured to provide an alternate treatment to the unauthorized user, wherein the alternate treatment is providing alternative information to the unauthorized user and wherein providing the alternative information comprises:

identifying the information requested by the unauthorized user;

identifying the alternative information to present to the unauthorized user that corresponds to the information requested by the unauthorized user; and providing the alternative information to the unauthorized user as the alternate treatment; and an executable portion configured to capture unauthorized user information from the unauthorized user based on the alternative one time credential or the alternate treatment.

19. The computer program product of claim 18, wherein the computer-readable program code portions further comprise:

an executable portion configured to request contact information from the unauthorized user to receive the alternative one time credential;

an executable portion configured to receive the contact information from the unauthorized user; and an executable portion configured to send the alternative one time credential based to the unauthorized user based on the contact information received from the unauthorized user.

* * * * *